(12) United States Patent
Seligman

(10) Patent No.: US 10,568,341 B2
(45) Date of Patent: Feb. 25, 2020

(54) LOW CARBOHYDRATE SUGAR FONDANT

(71) Applicant: D.Y. Seligman Consulting Ltd., Raanana (IL)

(72) Inventor: Judith Seligman, Raanana (IL)

(73) Assignee: D.Y. Seligman Consulting Ltd., Raanana (IL)

( * ) Notice: Subject to any disclaimer, the term of this patent is extended or adjusted under 35 U.S.C. 154(b) by 0 days.

(21) Appl. No.: 16/010,522

(22) Filed: Jun. 18, 2018

(65) Prior Publication Data

US 2018/0310587 A1 Nov. 1, 2018

Related U.S. Application Data

(63) Continuation of application No. PCT/IL2017/050048, filed on Jan. 16, 2017.

(60) Provisional application No. 62/279,715, filed on Jan. 16, 2016.

(51) Int. Cl.
```
A23G 3/38      (2006.01)
A23G 3/42      (2006.01)
A23G 3/34      (2006.01)
A23G 3/48      (2006.01)
```

(52) U.S. Cl.
CPC .............. *A23G 3/38* (2013.01); *A23G 3/343* (2013.01); *A23G 3/42* (2013.01); *A23G 3/48* (2013.01); *A23V 2002/00* (2013.01); *A23V 2200/044* (2013.01); *A23V 2200/15* (2013.01); *A23V 2200/228* (2013.01); *A23V 2200/3202* (2013.01); *A23V 2250/08* (2013.01); *A23V 2250/5118* (2013.01); *A23V 2250/51082* (2013.01); *A23V 2250/606* (2013.01); *A23V 2250/608* (2013.01); *A23V 2250/61* (2013.01); *A23V 2250/6402* (2013.01)

(58) Field of Classification Search
None
See application file for complete search history.

(56) References Cited

FOREIGN PATENT DOCUMENTS

WO    WO-2014128566 A2 *  8/2014  ............... A23G 3/54

OTHER PUBLICATIONS

"Erythritol—No Sugar, No Problem". Available online as of Nov. 1, 2004 from www.preparedfoods.com. pp. 1-3. (Year: 2004).*
"Cruising with a food allergy". Available online as of May 19, 2014 from www.icedgembakes.co.uk. pp. 1-30. (Year: 2014).*
"Sugar-Free Marzipan". Available online as of Dec. 23, 2012 from www.lowcarbsosimple.com. pp. 1-26. (Year: 2012).*

* cited by examiner

*Primary Examiner* — Jenna A Watts
(74) *Attorney, Agent, or Firm* — Mark M. Friedman

(57) ABSTRACT

There is provided a formula for creating a low carbohydrate value sugar fondant comprising: at least 50% by weight Erythritol, up to 30% by weight monosaccharide; and up to 5% by weight gelling agent, the fondant is used for pastry decorating and is flexible and stretchy and may be shaped and reshaped many times, and the formula has a caloric value of maximum 150 per 100 grams so that the blood sugar level is barely affected upon consuming the fondant.

21 Claims, 1 Drawing Sheet

|  | Reference Sugar fondant | Our low carb fondant |
|---|---|---|
| density [gr/cm³] | 2 | 2 |
| stiffness [gr/cm²] | 0.074 | 0.086 |

LOW CARBOHYDRATE SUGAR FONDANT

FIELD OF THE INVENTION

The present invention relates generally to food products, and more particularly to healthy pastry decorations.

BACKGROUND OF THE INVENTION

Sweets are usually enriched with sugars with very poor ingredient content and that is why they are unhealthy. For diabetic people, sweets are a luxury as their body does not react properly to carbohydrates (sugars and starch). Their blood glucose levels increase sharply after eating sugar and it remains in their blood longer than normal. Such an abnormal increase in blood glucose can cause damages to organs and tissues.

Sweets are also the cause of obesity and diseases. The World Health Organization recommended reducing sugar consumption to the maximum of 5 tea spoons a day. About 70% of the world population is overweight and is in high risk to develop diseases such as vascular diseases, heart diseases, cancers and Diabetes.

Sugar fondant is a dough made from sugar that can be rolled and flattened and it is used to decorate or sculpt cakes and pastries. It is usually made from sugar, water, gelatin, and glycerol. It has the texture akin to stiff clay. Sugar fondant is enriched with carbohydrates and has a high glycemic index which dramatically increases the blood sugar level. Sugar fondant has become very popular and is often used to decorate children's birthday cakes.

Sugar paste and fondant contain similar ingredients, but different in stiffness. Sugar paste may contain more gelatin and/or include an addition of a viscosity modifier or thickener materials to harden out completely. Sugar paste is ideal for creating the bigger cake decorations which stand up on a cake, or for the bigger flowers. Sugar fondant will stay softer, and is more ideal for smaller figures, flowers and other small decorations.

Others have formulated low-sugar baking goods, such as CANNAV in US Pub. No. 2016/0088857, disclosing a preparation of a sugar fondant including three types of sugars including Glucose. HAAS et al. in US Pub. No. 2002/0150663 discloses use of Erythritol in baking mixtures based on flour, PETERSON et al. in US Pub. No. 2003/0152683 discloses a sugar-free creamy icing. LEE et al. in US Pub. No. 2002/0160090 discloses a combination of sugars to sweeten beverages.

None of the mentioned publications disclose a formula for a sugar fondant low in calories having a texture and elasticity of traditional fondants.

Since the traditional sugar fondant is highly unhealthy, there is a need for a new formulation of sugar fondant that has a low glycemic index, while maintaining the texture and elasticity of the traditional sugar fondants.

SUMMARY OF THE INVENTION

Accordingly, it is a principal object of the present invention to overcome the limitations of prior art by providing a low sugar value fondant for decorating pastries. In accordance with a preferred embodiment of the present invention, there is provided a formula for creating a low sugar value fondant, said sugar fondant comprising:
at least 50% by weight Erythritol;
up to 30% by weight monosaccharide; and
up to 5% by weight gelling agent,
wherein said sugar fondant is used for pastry decorating and is flexible and stretchy and may be shaped and reshaped, and wherein said sugar fondant formula has a caloric value of maximum 150 kilocalories per 100 grams.

According to a preferred embodiment of the present invention, the inventive sugar fondant for decorating pastries is created from a formula having a low sugar value as compared to other sucrose-based sugar fondants. The formula is low in carbohydrate and calories, it contains less than 15 gr carbohydrates and 150 kilocalories per 100 gr of a sugar fondant product. This low carbohydrate sugar fondant can be made in different viscosities and stiffness levels to create shapes for decoration, creation of different candies, marzipans, and/or use as a drug carrier/packaging and other usages. The formula includes a combination of Erythritol with the monosaccharide fructose. The low carbohydrate formula is very similar in its stiffness and elasticity to the sugar fondant that is prepared form sucrose, but without the dramatic carbohydrate effect on blood glucose level. The fondant can be shaped and reshaped to create various decorations, without compromising its texture and elasticity. The fondant can be used to decorate sugar-free cakes or any other patisseries without increasing significantly the calories and carbohydrate content of patisseries it decorates.

According to another preferred embodiment of the present invention, the sugar fondant comprises up to 11% by weight of a humectant such as glycerin and oils which are added as a lubricant and for the purpose of improving smoothness and strength.

According to yet another preferred embodiment of the present invention, the sugar fondant also comprises starch for the purpose of thickening.

According to an additional preferred embodiment of the present invention, the sugar fondant comprises polysaccharide fibers such as Inulin, guar gum, etc., for improving elasticity and creating a smooth appearance.

According to a further additional preferred embodiment of the present invention, the Erythritol is mixed with Fructose-oligosaccharride (FOS) which is a mixture of oligosaccharides which are composed of fructose units connected by B links. FOS is a prebiotic, selectively stimulating the growth and/or activity of bacteria in the colon which are health beneficial. Scientific results demonstrate that consumption of FOS has a beneficial influence on glucose metabolism.

According to another preferred embodiment of the present invention, Carboxymethyl cellulose (CMC) may be added to the sugar fondant for creating a stiffer fondant for molding shapes for decorations that are rigid and dry quickly.

According to yet another preferred embodiment of the present invention, salt, vanilla or any other flavor enhancing agents may be added to the fondant according to taste and desire. Any color enhancing agents may be also added for providing a colorful sugar fondant decoration.

Additional features and advantages will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF THE INVENTION

Figures 1, 2:
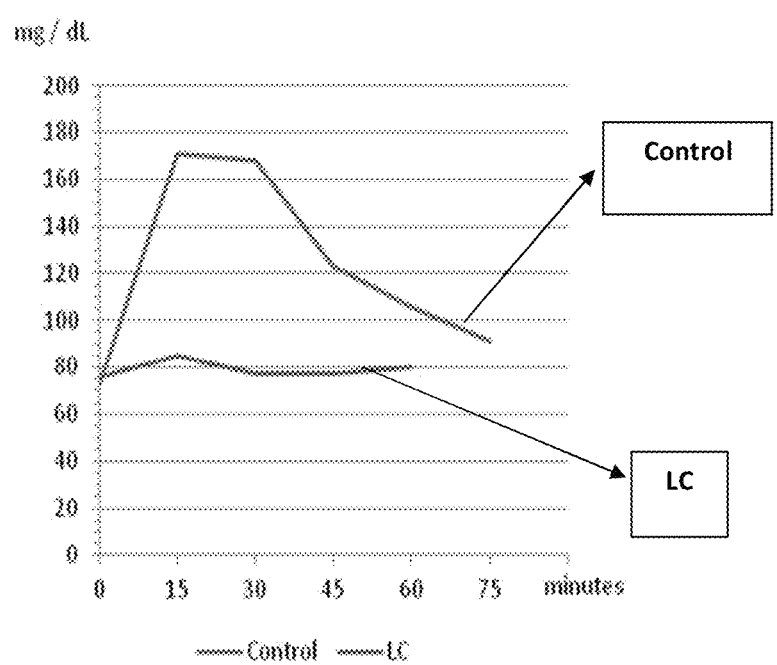
FIG. 1 is a table comparing between a reference sugar fondant and a low carbohydrate fondant formula no. 1 of a preferred embodiment of the present invention.
FIG. 2 shows a graph illustration of the effect of the low carbohydrate sugar fondant on blood glucose as compared to control standard sugar fondant.

It is a principal object of the present invention to provide a sugar fondant with a low carbohydrate value, and thus prevent a dramatic increase in blood sugar levels of a person consuming a pastry decoration.

The formula for the fondant is low in carbohydrate and calories, it contains less than 15 g net carbohydrates and 150 kilocalories per 100 g of the product. This low carbohydrate sugar fondant can be made in different viscosities and stiffness to create shapes for decoration, creation of different candies, marzipans, and/or use as a drug carrier/packaging and other usages. The formula includes a combination of Erythritol with fructose which is a monosaccharide. The low carbohydrate formula is very similar in its stiffness and elasticity to the sugar fondant that is prepared from sucrose, but without the carbohydrate effect on blood glucose level.

According to the preferred embodiment of the invention, the combination of Erythritol with fructose creates a fondant that sticks to dough. An addition of gelatin, corn starch, glycerol and oil can change the starchiness and stiffness of the dough. Other preservatives and colors can be added to the fondant to receive better features for decorating, creating different tastes, improving the design and shelf life of the products, etc.

Glycemic Index (GI)—is a number associated with a particular type of food that indicates the food's effect on a person's blood glucose (also called blood sugar) level. A value of 100 represents the standard, an equivalent amount of pure glucose. The GI represents the rise in a person's blood sugar level during the first two hours after consumption of the food. The glycemic effect of foods depends on a number of factors, such as the type of starch, physical entrapment of the starch molecules within the food, fat and protein content of the food and organic acids or their salts in the meal. The GI is useful for understanding how the body breaks down carbohydrates and only takes into account the net carbohydrate (total carbohydrate minus fiber) in a food.

Glycemic load (GL)—The glycemic load of food is a number that estimates how much the food will raise a person's blood glucose level after eating it. One unit of glycemic load approximates the effect of consuming one gram of glucose. Glycemic load accounts for how much carbohydrate is in the food and how much each gram of carbohydrate in the food raises blood glucose levels. Glycemic load is based on the glycemic index (GI), and is calculated by multiplying the grams of available carbohydrate in the food times the food's GI and then dividing by 100. In a given serving size, foods that are low in carbohydrates have a low glycemic response, they do not raise blood sugar sharply as compared to foods that are enriched in carbohydrates.

Fructose has a very low glycemic index of 19±2, compared with 100 for glucose and 68±5 for sucrose. It is 73% sweeter than sucrose at room temperature, so it can be used in low quantities. Studies show that small quantities of fructose have a positive effect if consumed before a meal and it may lessen the glycemic response of the meal. Erythritol, on the other hand, is a sugar alcohol (or polyol) that has almost no caloric value, does not affect blood sugar, does not cause tooth decay, and is partially absorbed by the body, excreted in urine and feces. Under U.S. Food and Drug Administration (FDA) labeling requirements, it has a caloric value of 0.2 kilocalories per gram (95% less than sugar and other carbohydrates), though nutritional labeling varies from country to country and in many countries it is labeled as zero-calorie. Erythritol is 60-70% as sweet as sucrose, thus the combination of Erythritol with a fructose creates a formula of intense sweet taste with low carbohydrate content and low glycemic load.

Erythritol is found naturally in some fruit and fermented foods and has positive health effect on the body as an antioxidant and prebiotic. It also has effects on remineralization of minor enamel defects and prevents caries and tooth decay. These qualities make Erythritol the best choice of a sugar substitute that can be given also to children, the main consumers for such sweets and decorations. Erythritol has a good flavor comparable to sugar, with a slight cooling effect that can be emphasized or eliminated in different combinations, according to the need. In the current invention it was able to create formulas with different flavors. It was found that the low solubility and excellent crystalline structure of Erythritol is of advantage for formulating paste and fondant. Erythritol acts as a great filler gaining physical properties such as elasticity, stiffness, color absorption and water retention in a formula. It was found that the fondant formula with Erythritol has the following additional advantages over the traditional sugar fondants made from sucrose: 1. it sticks less to the hands and surfaces, easy to lift up and leaves the hands clean; 2. it dries slower allowing delicate sculpting work; 3. It is easier to mend the dough, if it becomes wrinkled or torn during the preparation of the decoration.

Sugar is the generalized name for sweet, short-chain, soluble carbohydrates, many of which are used in food. They are composed of carbon, hydrogen, and oxygen. There are various types of sugar derived from different sources. Simple sugars are called monosaccharide's and include glucose (also known as dextrose), fructose and galactose. Other disaccharides include maltose and lactose. Longer chains of monosaccharide units bound together are called Polysaccharides. Chemically-different substances may also have a sweet taste, but are not classified as sugars. Some are used as lower-calorie food substitutes for sugar described as artificial (or natural) sweeteners.

Nutrition polysaccharides, starches and fibers, are common sources of energy. The human body easily breaks down the alpha-linkages (glycosidic bonds) of starches into glucose and consequentially raise blood glucose levels. However, the human body lack an enzyme to break the beta-linkages of fibers such as cellulose and other polysaccharides like Inulin, Guar gum, Xanthan gum, alginin and locust bean gum and that is why they partially digest and hardly contribute to blood glucose level.

Fructose was chosen as a sticking and stabilizing agent in addition to gelatin because of its low glycemic index as compared to sucrose or glucose. In addition, the increased solubility of fructose as compared to sucrose and glucose, was found to be advantageous in the experimental formulations as it is not crystalized like sugar. It has a low water activity and higher osmotic pressure than sucrose.

Fructose and Erythritol are excellent humectants and retain moisture for a long period of time so that the fondant does not dry while working with it, unlike traditional sugar fondants. Fructose and Erythritol contribute a more palatable texture and longer shelf life to the sugar fondant.

Fructose has a more intense sweetness compared to Erythritol and creates a very tasty flavor with Erythritol. The limited amount of fructose in the formulation in a combination with the 0 (or 0.2) caloric sugar Erythritol creates a sugar fondant and paste that contain very low net carbohydrates content and low calories. Thus, the fondant can be used to decorate cakes or any other patisseries without significantly increasing the calories and carbohydrate content of the patisseries it decorates.

The standard known formula of Sugar fondant/paste contains sugars as follows:
   Powdered or icing sucrose sugar (home sugar)
   Corn syrup/liquid glucose The low carbohydrate formula of the present invention contains sugars and sugar alcohols as follows:
   Erythritol (powdered or liquid)
   Fructose (liquid or crystals)

Some ingredients of the known standard sugar fondant formulas were added to the current invention's low in sugar and carbohydrate formula such as vegetable fat or white margarine, gelatin, water and glycerin to create a paste or fondant that looks like the traditional sugar pastes/fondants.

A formula based on Erythritol without monosaccharides such as glucose or fructose tends to create aggregations that do not stick to each other and break. The combination of Erythritol with a monosaccharide, such as fructose created a flexible paste that could be shaped and reshaped without breaking, similar to standard, traditional commercial sugar pastes.

Oligosaccharide Fibers with a low glycemic index, such as Xanthan gum, Guar gum and Inulin can be added to the formula to improve product quality without increasing significantly the net carbohydrates and calories. The current invention's formula includes some corn starch as a stabilizer, but it is possible to eliminate the corn starch from the formula or substitute it with other low glycemic index polysaccharides, such as Pectin. The formula with Pectin might be considered healthier because of its ability to lower cholesterol levels. Furthermore, Pectin has also shown promise as a potential aid to diabetics as several scientific studies have found improvements in glucose control following pectin supplementation.

The following description presents an example of a sugar fondant formula per the invention and a comparison of several additional inventive formulas.

EXAMPLE 1

A low carbohydrate Sugar fondant formula no. 1:
¼ tea spoon Gelatin in 10 ml water, a solution that contains 10 gr fructose in 10 ml water, 1 ml Glycerin, 3 gr corn starch, 1 table spoon coconut oil, 50 gr powdered Erythritol, a few grains of sodium and vanilla Referring now to FIG. 1, there is shown a table comparison between a reference sugar fondant and the current invention's low carbohydrate fondant formula no. 1. The table presents the values of the density and the stiffness of the reference fondant—which was made of powdered sugar (sucrose), and the current invention's low carbohydrate fondant with Erythritol.

$$\text{The density was calculated by } \frac{\text{weight [gr]}}{\text{volume [cm}^3\text{]}}$$

$$\text{The stiffness was calculated by } \frac{\text{weight [gr]}}{\text{flattened area [cm}^2\text{]}}$$

Referring now to FIG. 2, there is shown a graph illustrating the effect of the low carbohydrate sugar fondant on blood glucose as compared to control standard sugar fondant:

Control—is a sugar fondant that is made of sugar sucrose and glucose; LC—current invention's Low Carbohydrate sugar fondant that is made of Erythritol and fructose. The graph represents blood glucose levels of a healthy volunteer that ate 25 gr (serving size) of the Control fondant and 25 gr of LC fondant. Blood glucose levels were examined before eating (time 0) and 15, 30, 45, 60 and 75 min after their eating. As can be seen from the graph, the LC sugar fondant has no significant effect on blood glucose levels, while the Control sugar fondant increases blood glucose levels sharply.

EXAMPLE 2

A low carbohydrate Sugar fondant formula no. 2:
1 gr Gelatin and 15 gr fructose in 15 ml water, 4 gr Glycerin, 3 gr corn starch, 8 gr cannula oil, 2 gr Inulin, 177 gr powdered Erythritol, a few grains of sodium and vanilla.

EXAMPLE 3

A low carbohydrate Sugar fondant formula no. 3:
1 gr Gelatin and 15 gr fructose in 15 ml water, 4 gr Glycerin, 3 gr corn starch, 8 gr cannula oil, 2 gr Xanthan gum, 177 gr powdered Erythritol, a few grains of sodium and vanilla.

EXAMPLE 4

A low carbohydrate Sugar fondant formula no. 4:
1 gr Gelatin and 10 gr fructose in 15 ml water, 5 gr Glycerin, 177 gr powdered Erythritol, a few grains of sodium and vanilla.

TABLE 1

A comparison between four sugar fondant formulas:

| Materials | Formula no. 1 | | Formula no. 2 | | Formula no. 3 | | Formula no. 4 | |
|---|---|---|---|---|---|---|---|---|
| | gr | % in formula | gr | % in formula | gr | % in formula | gr | % in formula |
| Fructose | 10 | 10.5% | 15 | 6.6% | 15 | 6.6% | 10 | 4.8% |
| Gelatin | 2.3 | 2.4% | 1 | 0.4% | 1 | 0.4% | 1 | 0.5% |
| Corn starch | 3 | 3.1% | 3 | 1.3% | 3 | 1.3% | | |
| Coconut oil | 9 | 9.4% | | | | | | |
| Cannula oil | — | | 8 | 3.5% | 8 | 3.5% | | |

TABLE 1-continued

A comparison between four sugar fondant formulas:

| Materials | Formula no. 1 gr | % in formula | Formula no. 2 gr | % in formula | Formula no. 3 gr | % in formula | Formula no. 4 gr | % in formula |
|---|---|---|---|---|---|---|---|---|
| Glycerin | 1.26 | 1.3% | 4 | 1.8% | 4 | 1.8% | 5 | 2.4% |
| Inulin | | | 2 | 0.9% | 2 | 0.9% | | |
| Xanthan gum | — | | | | | | | |
| Salt | pinch | | pinch | | pinch | | pinch | |
| Vanilla | pinch | | 1 | | 1 | | 1 | |
| Water | 20 | 20.9% | 15 | 6.6% | 15 | 6.6% | 15 | 7.2% |
| Erythritol | 50 | 52.3% | 177 | 78.3% | 177 | 78.3% | 177 | 84.7% |
| Total/gr | 95.4 | | 226 | | 214 | 6.6% | 209 | |

The percentages of the formula components in the total sugar fondant weight is indicated
The amounts of materials are presented in gr, where:
Gelatin 1 tea spoon=9.25 gr
Coconut oil 1 table spoon=9 gr
Glycerin 1 ml=1.26 gr

TABLE 2

Nutritional facts of formula 1 and formula 4 as compared to standard commercial sugar paste
Nutrition Facts per 100 gr

| | Formula 1 | Formula 4 | Standard | % of Standard |
|---|---|---|---|---|
| Calories [Kcal] | 148.4 | 30.0 | 368 | −60% to −92% |
| Net Carbohydrates [gr] | 14.6 | 7.0 | 99.8 | −85% to −93% |
| Protein [gr] | 1.8 | 0.4 | 0.9 | |
| Total Fat [gr] | 9.4 | 0 | 0.6 | |

TABLE 3

Characteristics of sugar fondant formulas

| | Create Smooth ball | flatten and lift up without collapsing | Fold without breaking | Roll and stretch to a tube without breaking | Tube curving without breaking | Smooth edges after cut | Good texture and taste |
|---|---|---|---|---|---|---|---|
| Formula 1 | +++++ | +++++ | +++++ | ++++ | +++++ | +++++ | +++++ |
| Formula 2 | +++++ | +++++ | +++++ | +++++ | +++++ | +++++ | +++++ |
| Formula 3 | +++++ | +++++ | +++++ | +++++ | ++++ | +++++ | +++++ |
| Formula 4 | ++++ | ++++ | ++++ | +++++ | ++++ | ++++ | ++++ |
| formula 2 without corn starch | +++++ | +++++ | ++++ | +++++ | +++++ | +++++ | +++++ |
| formula 2 without Fructose | ++ | ++ | + | + | + | + | ++++ |
| formula 2 without Glycerin | ++++ | +++++ | +++ | +++++ | +++ | ++++ | ++++ |
| formula 2 without Gelatin | + | + | + | + | + | + | ++++ |
| formula 2 without oil | ++++ | ++++ | +++ | +++ | +++ | +++ | ++++ |

+ Low score;
+++++ high score

EXAMPLE 5

A different variation of formula 4 with sucrose (Formula 4*) with a caloric value similar to Formula 1.

TABLE 4

A comparison between sugar fondant formulas 1, 4 and 4*

| Materials | Formula no. 4 gr | % in formula | Formula no. 4* gr | % in formula | Formula no. 1 gr | % in formula |
|---|---|---|---|---|---|---|
| Fructose | 10.0 | 4.8% | 10.0 | 4.8% | 10.0 | 10.5% |
| Gelatin | 1.0 | 0.5% | 1.0 | 0.5% | 2.3 | 2.4% |
| Corn starch | | | | | 3.0 | 3.1% |
| Coconut oil | | | | | 9.0 | 9.4% |
| Cannula oil | | | | | | |

TABLE 4-continued

A comparison between sugar fondant formulas 1, 4 and 4*

| Materials | Formula no. 4 | | Formula no. 4* | | Formula no. 1 | |
|---|---|---|---|---|---|---|
| | gr | % in formula | gr | % in formula | gr | % in formula |
| Glycerin | 5.0 | 2.4% | 5.0 | 2.4% | 1.3 | 1.3% |
| Inulin | | | | | | |
| Guar Gum | | | | | | |
| Xanthan gum | | | | | | |
| Salt | 0.1 | | 0.1 | | 0.1 | |
| Vanilla | 1.0 | | 1.0 | | 0.1 | |
| Water | 15.0 | 7.2% | 15.0 | 7.2% | 20.0 | 20.9% |
| Sucrose | | | 62.0 | 29.7% | | |
| Erythritol | 177.0 | 84.7% | 115.0 | 55.0% | 50.0 | 52.3% |
| Total/gr | 209.1 | | 209.1 | | 95.7 | |
| caloies/kkcal | 30 | | 150 | | 150 | |
| Net carbs | 7 | | 38 | | 12 | |

Formula no. 1 contains a high percentage of water and the fondant is softer compared to formulas 2-4. For hardening the formula and achieving the texture of a sugar paste that is stiffer than a fondant, the concentration of Erythritol was increased in formula no. 1. It is known that the stiffness of the dough can be changed and that addition of viscosity modifiers or thickening materials can harden the dough. Thus, formula nos. 2-4 are the paste format of the fondant presented in formula 1. The addition of Erythritol to formula 1 added to the stiffness of the fondant and at the same time increased the total volume of the fondant, resulting in less calories and carbohydrates per total weight (see table 1). Surprisingly, the stiffness did not affect the elasticity and molding capabilities of the paste. By contrast, the stiffness and strength are in fact advantageous to most decorations and sweets designs.

The addition of polysaccharides such as Inulin dietary fibers and Xanthan gum in formula 2 and 3, respectively, affect stiffness and elasticity of the sugar fondant and created variations of texture, appearance and tastes that are of value to various decorations and sweets.

It is possible to reduce caloric value and carbohydrates by also reducing the percent of the oil and starch in the formula (shown in formula 4). A difference was not noted in the fondant characteristics when coconut oil was replaced by cannula oil and/or olive oil (not shown).

Formula 4 demonstrates the minimal formula in which the corn starch and oil were eliminated and Fructose was reduced to 4.9% of the total weight. Such a formula is good for various decorations and contains only 30 calories and 7 gr carbohydrates per 100 gr (see table 1). Erythritol has only 0.2 calories and 0 net carbohydrates. Thus, it does not contribute calories and net carbohydrates to the formula. As can be seen from the table, the formulas contain less than 10 percent of the calories and carbohydrates as compared to the standard commercial sugar fondants.

It is possible to increase fructose in the formula, however, such a formula will add unnecessary calories and carbohydrates since a concentration of 11% of total weight (as shown in formula 1) is enough to create a fine textured fondant that is stable, smooth and elastic, having features that are very similar to the commercial sugar fondant. Even formulas 2-4 which contain about 7% fructose still maintain the quality and the characteristic of the fondant having the capability of creating and shaping it into a full range of shapes for decoration.

All presented formulas were useful for various cake decorations and candies. It was found that Carboxymethyl cellulose (CMC) reacts with these formulas similarly as with other commercial sugar fondants, and so creating a stiffer format of the fondant that dries quicker. CMC can be added to create a fondant that is suitable for creating stiff, large figures or for molding.

According to the preferred embodiment of the present invention, fructose or glucose are mandatory for the creation of the fondant with Erythritol. Unlike the sugar fondants from sucrose which may create a fondant without the glucose, Erythritol will not bind to the other components in the formula to create a matrix of a fondant without fructose or glucose. It is probably due to its low solubility and its unique crystalline structure that is different from sucrose.

According to the preferred embodiment of the invention, at least 3% fructose or glucose is needed for the creation of the fondant. A formula that contains fructose in the amount of less than 3% of total weight cannot be flattened and lifted without collapsing. The stickiness of the dough is improved by increasing the percentage of fructose in the formula. It was found that there is no benefit in increasing the amount of fructose over 30% of total weight, as it does not improve the quality of the fondant, but increases significantly the caloric value and carbohydrates. Nevertheless, it is possible to create a formula having less than 150 caloric value with less than 40% sugar, based on formula 4, when 20-30% of the Erythritol is replaced with sucrose or any other sugar, sweetener or any combination thereof.

According to the preferred embodiment of the invention, a gelling agent is also a fundamental element in the formula. Without gelatin the Erythritol molecules cannot stick to form a stable fondant. Unlike sucrose that is soluble and sticky, Erythritol does not stick and has low solubility. The combination with gelatin is needed for the elasticity and for the creation of the fondant with Erythritol. It seems that both, gelatin and fructose stabilize the matrix of the fondant, thereby allowing the Erythritol to stick and create the fondant.

The addition of glycerin to the formula is not mandatory. However, formulas without glycerin were less elastic and tended to break easily. Glycerin is a simple polyol compound that is sweet-tasting. It is used in the food industry as a sweetener and humectant and in pharmaceutical formulations.

It is possible to add to the sugar fondant stiffening agents to make the fondant very hard so it can be eaten as a candy. Any coloring agents and flavor enhancing agents may be added.

It is also possible to add seeds such as nuts and almonds to have the fondant taste like marzipan.

Another possibility is adding super foods such as chia seeds, flax seeds, goji berry and Spirulina providing the sugar fondant with natural authentic supplements.

Although particular embodiments of the invention have been described and illustrated herein, it is recognized that modifications and variations may readily occur to those skilled in the art and consequently, it is intended that the claims be interpreted to cover such modifications and equivalents.

I claim:
1. A low carbohydrate value sugar fondant, said sugar fondant comprising:
    at least 51% by weight erythritol;
    at least 3% by weight fructose; and
    between 0.4 and 2.4% by weight gelatin, wherein said sugar fondant has a caloric value of maximum 150 kilocalories per 100 grams wherein said erythritol comprises more than 97% of total polyol content of said fondant.

2. The fondant of claim 1, wherein said sugar fondant further comprises a humectant selected from the group consisting of glycerin, propylene glycol, and honey.

3. The fondant of claim 1, wherein said sugar fondant further comprises up to 2% of a polysaccharide fiber selected from the group consisting of inulin, xanthan gum, alginin, guar gum, and locust bean gum.

4. The fondant of claim 1, wherein said sugar fondant further comprises oil selected from the group consisting of coconut oil, olive oil, palm oil, soybean oil, canola oil, corn oil, and peanut oil.

5. The fondant of claim 1, wherein said fructose is a fructose-oligosaccharide (FOS).

6. The fondant of claim 1, wherein said sugar fondant further comprises carboxymethyl cellulose (CMC).

7. The fondant of claim 1, wherein said sugar fondant further comprises any combination of salt, vanilla, and any other flavor and flavor enhancing agents.

8. The fondant of claim 1, wherein said sugar fondant further comprises any color enhancing agents.

9. The fondant of claim 1, wherein said sugar fondant further comprises starch.

10. The fondant of claim 1, wherein said sugar fondant further comprises 0% to 30% water.

11. The fondant of claim 1, wherein said sugar fondant comprises vitamins, minerals and prebiotic compounds, and other food supplements.

12. The fondant of claim 1, wherein said sugar fondant comprises starch for providing said fondant as a substantially rigid form for creating stiff pastry decorations.

13. The fondant of claim 1, wherein said sugar fondant comprises a combination of flavor agents and stiffening agents for providing said fondant for use as a candy.

14. The fondant of claim 1, wherein said sugar fondant comprises seeds selected from the group consisting of nuts and almonds.

15. The fondant of claim 1, wherein said sugar fondant further comprises super foods selected from the group consisting of chia seeds, flax seeds, goji berry and, spirulina.

16. The fondant of claim 1, wherein said sugar fondant further comprises a humectant.

17. The fondant of claim 1, wherein said sugar fondant further comprises polysaccharide fibers.

18. The fondant of claim 1, wherein said sugar fondant further comprises one of oil and fat which provides flavors, minerals, and strength to said sugar fondant's texture.

19. The fondant of claim 1, wherein said sugar fondant comprises seeds for providing flavor.

20. The fondant of claim 1, wherein said sugar fondant further comprises super foods.

21. The fondant of claim 9, further comprising starch selected from the group consisting of corn starch, arrowroot, katakuri starch, potato starch, sago, tapioca, and their starch derivatives.

* * * * *